Figure 1:
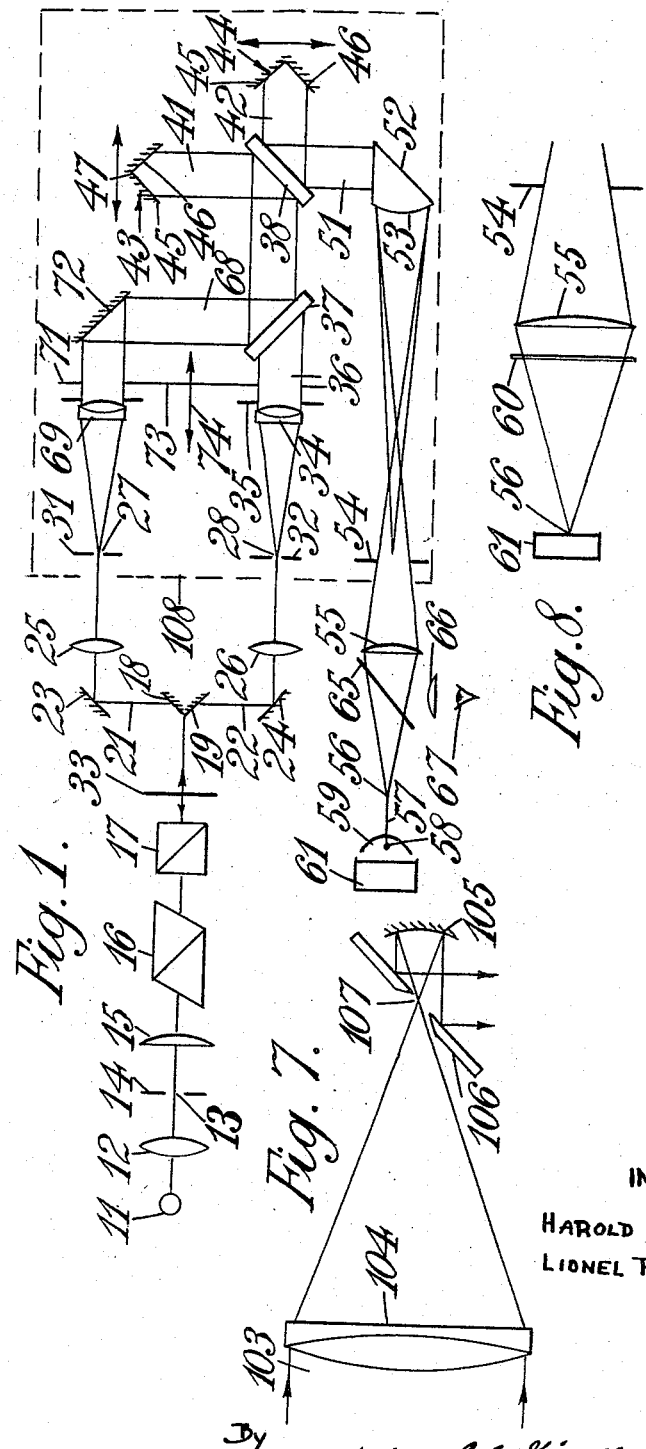

March 24, 1959    H. H. HOPKINS ET AL    2,878,722
APPARATUS AND METHODS FOR TESTING OPTICAL
SYSTEMS, LENSES AND THE LIKE
Filed April 4, 1956      4 Sheets-Sheet 1

INVENTORS
HAROLD H. HOPKINS
LIONEL R. BAKER

By Watson, Cole, Grindle & Watson
ATTORNEYS

INVENTORS
HAROLD H. HOPKINS
LIONEL R. BAKER
By
Watson, Cole, Grindle & Watson
ATTORNEYS

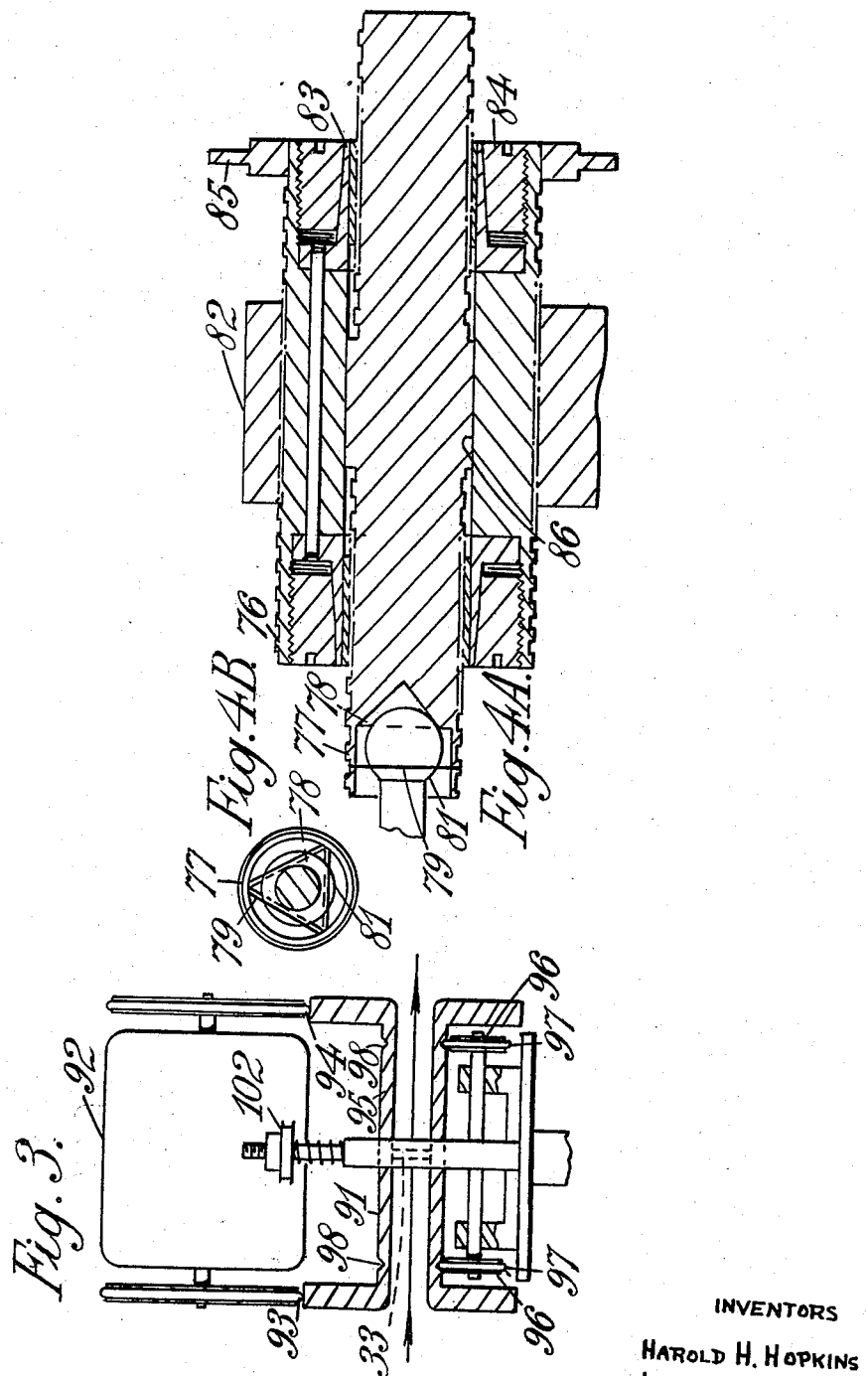

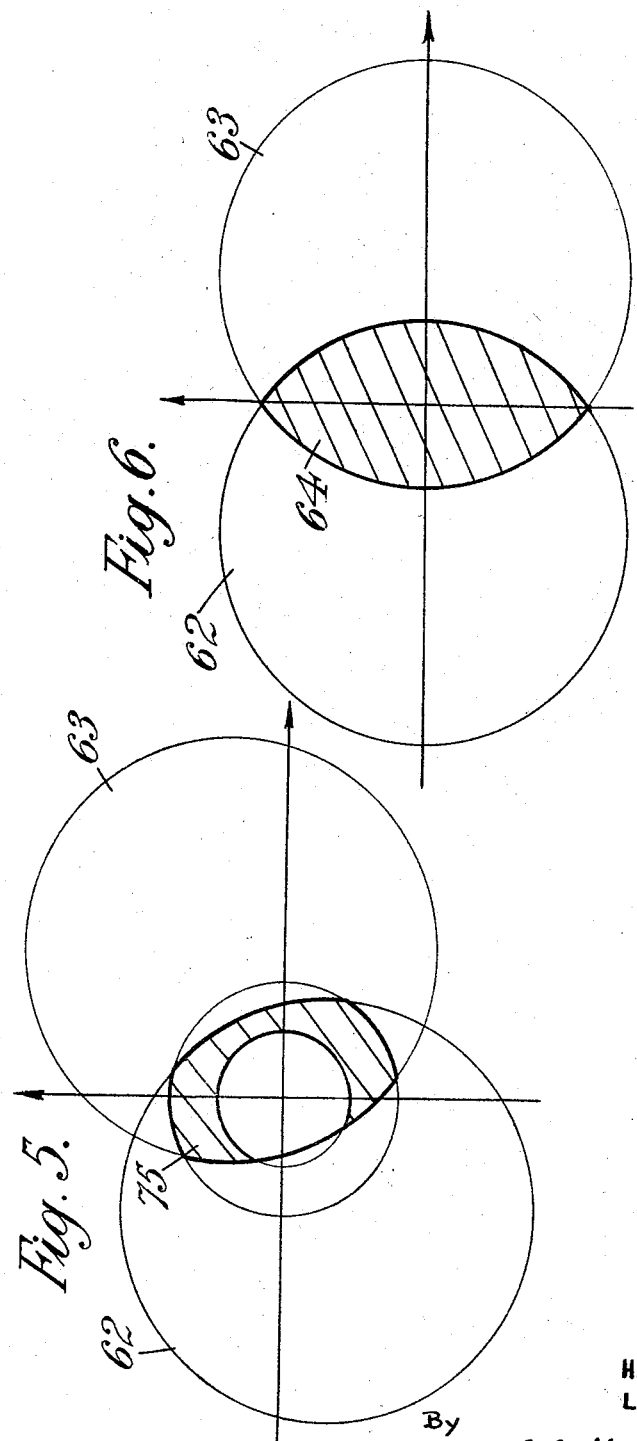

United States Patent Office 2,878,722
Patented Mar. 24, 1959

2,878,722

APPARATUS AND METHODS FOR TESTING OPTICAL SYSTEMS, LENSES AND THE LIKE

Harold Horace Hopkins, London, and Lionel Richard Baker, Fleet, England, assignors to National Research Development Corporation, London, England, a corporation of Great Britain Application April 4, 1956, Serial No. 576,103

Claims priority, application Great Britain April 4, 1955

19 Claims. (Cl. 88—56)

The invention relates to apparatus and methods for testing optical systems, lenses and the like and it is an object of the invention to provide improved apparatus, and an improved method, for that purpose.

The invention provides apparatus for testing an optical system, lens or other component, comprising a straight line (or point) source (preferably monochromatic) for providing light to pass through the system or component (or to be reflected by it, in the case of a reflecting system or componet); means for dividing the amplitude of the wavefront of the beam emergent from the system or component to form two compenent beams having respectively two mutually similar coherent wavefronts; means for directing the component beams to overlap with their wavefronts parallel to one another but in sheared relationship, so that the two coherent wavefronts mutually interfere (the direction of shear being effectively perpendicular to the length of the line when a line source is employed); means for varying the amount of shear between the two wavefronts, or (or and) means for varying the relative optical path lengths travelled by the two component beams before they overlap as aforesaid; and means for measuring the consequent change in the total light flux in the interferogram produced by the interfering beams, or in a selected part of that interferogram.

The apparatus enables information to be obtained relating to the defects, or image-forming or like properties, of the optical system, lens or component.

The said means for dividing the wavefront preferably comprise a partially reflecting partially transparent surface or layer, and the said means for directing the component beams to overlap preferably comprise, for each component beam, a reflecting unit comprising two or three mutually perpendicular plane reflecting surfaces arranged to reflect the component beam with which it is associated so that after reflection that beam travels parallel to its direction of incidence on the reflecting unit. One or each of the said reflecting units is preferably movable in a direction such as to vary the amount of the aforesaid shear between the two wavefronts. Preferably one or each of the said reflecting units is movable in a direction such as to vary the relative optical path lengths travelled by the two component beams before they overlap as aforesaid.

The apparatus preferably includes a second monochromatic straight line (or point) source (similar to the first mentioned source and of the same colour) for providing light to pass through a reference system or component similar to the system or component under test (or to be reflected by the reference system or component, when it is a reflecting system or component); means for repeatedly substituting the reference beam emerging from the reference system or component in place of the test beam emerging from the system or component under test (e.g., including means for repeatedly rendering the sources alternately inoperative); means for comparing the total light flux in the said interferogram, or the selected part thereof, with the total flux in the corresponding interferogram, or similarly selected part thereof, produced when the said reference beam is substituted for the said test beam (which corresponding interferogram may in some cases be a uniformly illuminated area); means for varying the relative total light fluxes in the reference beam and the test beam to make the total light fluxes in the first mentioned interferogram (or selected part thereof) and the said corresponding interferogram (or selected part thereof) equal before and after a change, as aforesaid, in the amount of shear or relative optical path lengths; and means for indicating the amount of such variation and thereby indicating the said consequent change in the total light flux in the first-mentioned interferogram or selected part thereof, thereby to provide information as to aberration-forming or like differences between the system or component under test and the reference system or component.

The invention includes a method of testing an optical system, lens or other component, comprising directing light, derived from a straight line (or point) source, on to the system or component so that the light passes through it (or is reflected by it, in the case of a reflecting system or component); dividing the amplitude of the wavefront of the beam emergent from the system or component to form two component beams having respectively two coherent wavefronts; directing the component beams to overlap with their wavefronts parallel to one another but in sheared relationship, so that the two coherent wavefronts mutually interfere; varying the amount of shear between the two wavefronts, or the relative optical path lengths travelled by the two component beams before they overlap as aforesaid; and measuring the consequent change in the total light flux (e.g., for light of one colour) in the interferogram produced by the interfering beams, or in a selected part of that interferogram.

The method preferably includes repeatedly substituting a reference beam for the said emergent beam and changing the relative total light fluxes (e.g., for light of the said colour) in the reference beam and the emergent beam to compensate for the said change in the total light flux in the interferogram, or the selected part of the interferogram, the required change in the said relative total light fluxes to produce such compensation providing a measure of the said change in the total light flux in the interferogram, or the selected part of the interferogram.

The variation of intensity along a line in any object in the object surface or plane of a lens can be resolved, by Fourier analysis, into a set of independent "spacial-frequency" components, which components are of sinusoidal form and are an harmonic series. Spacial frequency is expressed in cycles per unit length. The corresponding spacial-frequency components in the image produced by the lens differ, in intensity or (or and) spacial phase, from the respective spacial frequency components in the object, so that for each spacial frequency there is a complex factor which expresses the effect of the lens on that spacial-frequency. Consequently, there is a complex characteristic (the "frequency transmission characteristic" of the lens) which expresses the variation of the transmission of the lens as a function of variation in spacial-frequency, and can be used to express the aberrations or other defects of the lens without reference to any particular test object.

It can be shown theoretically that if the image-forming wavefront is passed through a wavefront shearing interferometer which maintains the relatively sheared wavefronts mutually parallel, then the total light flux through the interferogram produced varies with spacial-frequency in the same way as the frequency transmission characteristic. If the optical path length difference in the interferometer is an integral number of wavelengths of the light employed then the "real" or "inphase" part of the characteristic is obtained, whereas if that optical path length difference is an integral number of half wave-lengths then the "imaginary" part of the characteristic is obtained. Thus apparatus, or a method, in accordance with the invention may be employed, for instance, to determine all or part of the frequency transmission characteristic. The characteristic depends not only on the lens itself but also on the nature of the object illumination, but the latter factor can be allowed for e.g., by masking off part of the interferogram in appropriate cases.

Figure 2:
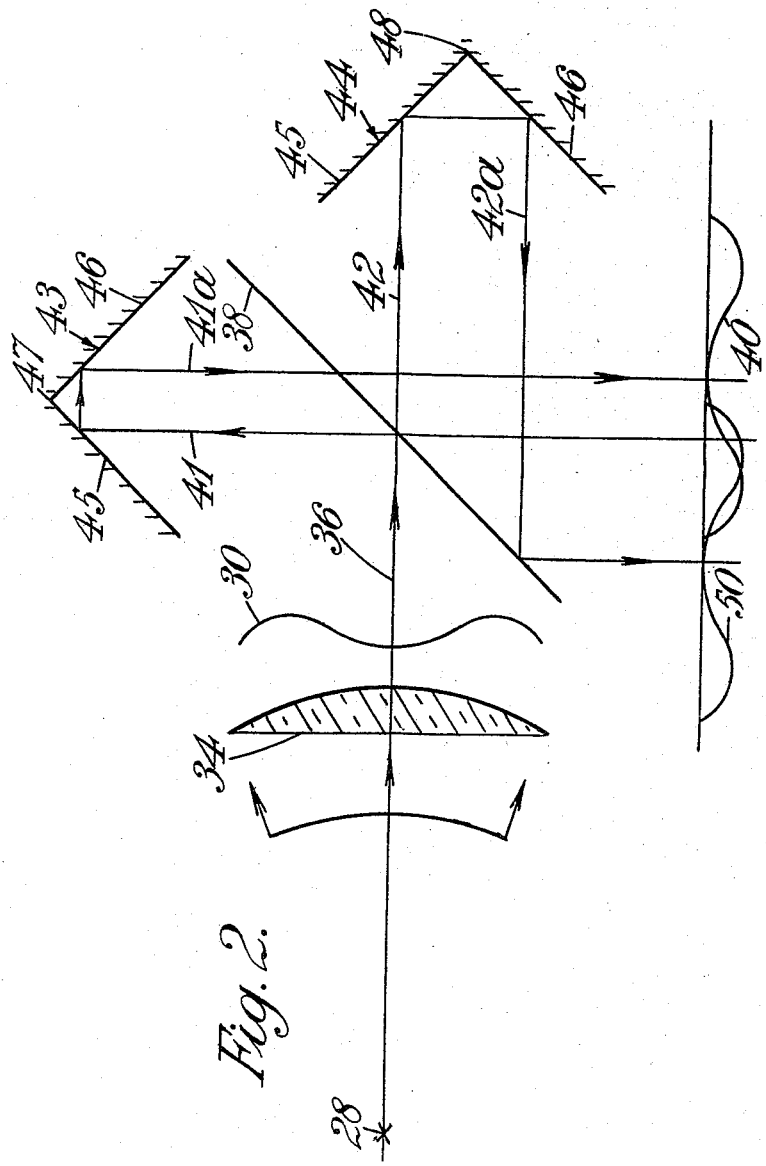

A specific apparatus for, and method of, testing lenses, which apparatus and method each embody the invention, will now be described by way of example and with reference to the accompanying drawings, in which:

Figure 1 is a diagram of the optical system of the apparatus,

Figure 2 is a diagram illustrating the shearing of the wavefronts, only the central rays of the various beams being shown, Figure 3 shows diagrammatically the arrangement for rotating the rotary polarisation filter, Figure 4A is a sectional view of the arrangement for moving one of the reflector units, Figure 4B is an end view of the arrangement shown in Figure 4A, Figures 5 and 6 illustrate the shapes of apertures in two alternative masks which may be employed for selecting all or part of the interferogram for measurement, Figure 7 shows an arrangement whereby the apparatus may be adapted for use with lenses of large aperture, and Figure 8 shows a preferred modification.

In this example light from a sodium vapour lamp 11 is directed by a condenser lens 12 on to a narrow vertical slit 13 formed in an opaque mask 14. The slit 13 is at the focus of a collimating lens 15 from which a parallel beam of the monochromatic light thus derived from the sodium vapour lamp passes in turn through a Nicol prism 16, which polarises it, and a Wollaston prism 17 which splits the polarised beam into two beams polarised mutually at right angles. These two beams mutually diverge at an angle of about one degree and fall respectively on two mutually perpendicular plane reflectors 18, 19, which direct one (21) of the two beams, on to a plane reflector 23, and the other (22) of the two beams on to a plane reflector 24. The beams 21, 22 are thereby reflected to pass respectively through condenser lenses 25, 26 which direct them respectively on to two narrow vertical straight slits 27, 28, formed in opaque masks A disc 33 of sheet polarising material of the kind known under the trade name Polaroid is provided in the beams 21, 22 and is rotatable about a horizontal axis bisecting the angle between their axes, so that as it, or the Nicol prism 16, rotates, it progressively varies the relative intensities of the two beams. Each beam is cut off completely at one angular position of the disc 33, or the Nicol prism 16, and the angular position of the disc 33, or prism 16, at which one of the beams is cut off is spaced by 180 degrees from the angular position at which the other beam is cut off. The sum of the intensities of the two beams remains constant throughout the rotation of the disc or of the prism 16.

Light passing through the slit 28, which acts as a coherent source, passes through a lens 34, which is the lens under test, and emerges through an aperture stop 35 providing the exit pupil for that lens. The slit 28 is situated at the focus of the lens 34 so that the beam 36 emerging from the lens 34 is a parallel beam, the exact form of its wavefront 30 depending upon the aberration-forming properties or other defects of the lens 34. The beam 36 passes through a partially-transmitting partially-reflecting plate 37 to a second partially-transmitting partially-reflecting plate 38 constituting a "beam-splitter" as employed in a Michelson interferometer. The beam-splitter 38 divides the amplitude of the wavefront of the beam 36 to form two component beams 41, 42, having respectively two mutually similar coherent wavefronts, which beams fall respectively on two reflector units 43, 44. Each of these reflector units comprises two vertical plane surface reflectors 45, 46 which are mutually perpendicular and meet in a vertical line 47, 48. These reflector units 43, 44 have the property of reflecting the beams 41, 42 back along paths parallel to those on which they are incident on the reflector units (the central rays being shown at 41a and 42a in Figure 2) so that the beams 41, 42 are caused by the beam splitter 38 to follow a path 51 in which they mutually overlap with their wavefronts 40, 50, parallel to one another but in sheared relationship, so that the wavefronts 40, 50 mutually interfere. The interfering beams are reflected by a prism 52 having a face 53 of lens form so that the exit pupil 35 is imaged at an apertured opaque mask 54. The interfering beams pass through the aperture in that mask and are focussed by a lens 55 so that an image of the slit 28 is formed at 56. Near 56 there is positioned, as shown in Figure 8, a diffraction grating 60 as described in copending British patent application No. 4535/55 and in an article entitled "An Integrating Photometer Employing Scalloped Gratings" by L. R. Baker on pages 418–421 of the "Journal of Scientific Instruments," volume 32, No. 11, November 1955, so that there is produced from the slit image a substantially evenly illuminated square area, the total light flux in that area being equal to the total light flux in that slit image.

Figure 1 shows an alternative to the diffraction grating, namely a two inch length of high transmission glass rod 57 about 1/20 inch diameter terminating in an opal sphere 58 at the focus of a paraboloidal mirror 59. The arrangement shown in Figure 8 is preferred.

The light from the grating falls on the photo-cathode of a photo-multiplier electronic device 61 which is coupled to electronic circuits to provide an indication of the total light flux issuing from the grating and variations in that total light flux with time.

The reflector units 43, 44 are adjustably movable horizontally in directions parallel to, or perpendicular to, the directions of the beams 41 and 42 associated with them respectively. As will be appreciated from Figure 2, movement of one or other of the reflector units 43, 44 perpendicularly to the direction of its associated beam 41 or 42 will vary the amount of shear between the wavefronts 40, 50; and movement of one or other of the reflector units 43, 44 parallel to the direction of its associated beam 41 or 42 will vary the relative optical path lengths travelled by the two component beams 41, 42 before they overlap as aforesaid.

The image formed in the plane of the mask 54 comprises two overlapping circular images 62, 63, formed respectively by the two interfering beams, with an interferogram in the shaded region 64 (see Figure 6), where the images 62, 63 overlap. When the lens 34 is a camera lens (or other lens intended to be normally employed with a broad incoherent object), then the mask 54 is preferably designed to permit only the light contained in the interferogram 64 to pass through it. A partially-reflecting partially-transmitting plate 65 is provided to permit the interferogram and mask aperture to be viewed through an eyepiece 66 by an eye at 67.

In use of the apparatus to determine the frequency transmission characteristic of the lens 34, the reflector units 43, 44 are moved in steps to provide a series of different values for the amount of shear of the wavefronts 40, 50. For each such value of the amount of shear the reflector units are first set to provide zero optical path length difference between the paths traversed by the beams 41, 42 prior to their interference and the reflector units are then set to provide an optical path length difference of one half of the wavelength of the light frequency (colour) employed, between the paths traversed by the beams prior to their interference. At each setting of the reflector units the total light flux through the interferogram 64 is measured. The variation of that light flux with variation of amount of shear is then plotted for zero optical path difference to provide the "real" part of the frequency transmission characteristic, and then the corresponding variation with one half wavelength optical path length difference is plotted to provide the "imaginary" part of the frequency transmission characteristic.

To facilitate the setting of the reflector units 43, 44 and to facilitate accurate measurement of the changes in the light flux in the interferogram 64, a reference beam 68 is provided by means of a reference lens 69 having the slit 27 at its focus. The reference lens 69 is generally similar to the lens 34 but is substantially free from defects so that the beam 68 has a plane wavefront. The lens 69 has a mask 71 similar to the mask 35, and the beam 68 is reflected by a plane reflector 72 so that it is reflected by the plate 37 to be exactly superimposed on the test beam 36 in travelling to the beam splitter 38. The reference beam 68 is divided into two component beams, in the same way as the test beam, and they pass through the rest of the system, and interfere, in the same way as the component beams 41, 42. It will be appreciated that the reference beam 68 may be substituted for the test beam 36 by rotating the filter disc 33 to an angular position such that it cuts off the beam 22 and that the reference beam may be repeatedly substituted for the test beam by continuous rotation of the filter disc 33, so that the test beam and the reference beam are alternatively extinguished. If the total light fluxes in the interferograms produced by the test beam and the reference beam respectively are unequal then the intensity of the light falling on the photo-multiplier device will vary cyclically as the disc 33 is rotated and an electronic signal will consequently be generated having a frequency determined by the speed of rotation of the disc 33.

The relative intensity of the light in the two beams 21 and 22 (and consequently in the two beams 36 and 68) can be varied, as aforesaid, by rotating the Nicol prism 16 and this prism is carried by a holder which moves a pointer and scale relatively to indicate accurately the angular setting of the Nicol prism. If the Nicol prism is set so that no electronic signal is generated when the disc 33 is rotated continuously, and then after movement of the reflector units 43, 44 the Nicol prism is again set so that no electronic signal is generated, the angular movement of the Nicol prism between those two settings is a measure of the change in the total light flux in interferogram of the test beam 36 due to the movement of the reflector units.

In setting the reflector units 43, 44 to provide a zero, or half wavelength, path length difference those reflector units are adjusted to provide respectively a maximum or a minimum intensity in the uniformly illuminated area which is the interferogram produced at 64 by the two interfering sheared plane wavefronts derived from the plane wavefront of the reference beam 68. To provide a substantially uniformly illuminated comparison area as its interferogram the beam 36 may be passed, during that setting operation, through a sheet of glass which introduces into it very bad aberrations so that the wavefront of the beam 36 is badly distorted. The phase variation along the wavefront is then substantially of a random nature and the interferogram is of very irregular form.

A similar sheet of glass is introduced into the reference beam 68 when the Nicol prism 16 is being adjusted while the filter disc 33 is rotating, so as to reduce the average intensity of the interferogram produced by the reference beam when the path difference is zero and to increase the average intensity of the interferogram when the path difference is a half-wavelength. This enables the test beam interferogram to be matched to it in intensity by critical angular setting of the Nicol prism 16. The glass sheets are carried by a carrier 73 rotatable about an axis 74.

If the characteristics of a different type of lens or system are to be measured, e.g., a microscope objective, which is intended for use with an object other than a broad incoherent object, then the mask 54 may be provided with an aperture shaped to allow only a selected part of the interferogram 64 to pass through it. The necessary shape of the mask can be determined theoretically from the distribution of intensity in the effective source of object illumination to be employed in normal use of the lens. For instance, in a particular case of a microscope employing an annular stop aperture in the outstage condenser the appropriate aperture in the mask 54 would be of the shape and size indicated by the shaded area 75 in Figure 5.

As very accurate and stable setting of the reflector units 43, 44 is necessary they are mounted on accurate kinematic tracks and are moved by fine lead screws, made as described in an article entitled "Construction of a Lead-Screw Without a Master Thread," by L. R. Baker, on pages 446–448 of the "Journal of Scientific Instruments," volume 32, No. 11, November 1955, and arranged to provide a differential kinematic screw feed. The arrangement of one of these differential screws and its associated special coupling are shown in Figures 4A and 4B. The pitch of the larger outer screw 76 is 0.0014 in. and that of the inner one 77 is 0.0011 in. giving a differential pitch of 0.0003 in. These wire diameters were chosen as being conveniently available. A much smaller overall pitch may be obtained by a suitable selection of wires.

A special kinematic coupling was designed for use with these screws. This proved to be simple to make and yet highly effective in practice. The seating comprises a trihedral hollow 78 in the entrance of which is placed an equilateral triangle formed from three lengths 79 of spring steel wire. A ball-ended coupling 81 (connected rigidly to the associated reflected unit) is inserted so that the three spring elements 79 bow out and then spring round the ball 81 so as to retain it firmly against the seating 78. The reference numeral 82 indicates the nut for the outer thread, 83 indicates the nut for the inner thread, 84 indicates a ring which screws in to clamp the collet shaped nut 83 over the screw 77, 85 indicates a driving dog, and 86 indicates a plain bearing guiding the motion of the screw 77.

For the coarse adjustments the large outer screw 76 is advanced together with the inner screw 77 and for the fine adjustment the inner screw 77 is clamped by means of a collet and so advances back through the outer element 76, so producing an overall differential advancement.

The electronic signal is amplified by an amplifier tuned to the frequency of rotation of the disc 33, for increased sensitivity, and the disc 33 is therefore mounted in a "duralumin" tube 91 (see Figure 3) which is capable of rotation at speeds of the order of 3,000 r.p.m. The disc is of about one half inch in diameter and the tube is rotated by an electric motor 92. The motor 92 is mounted on top of the tube 91 and has a friction drive to the latter at both ends at 93, 94. The tube 91 itself is turned to a smaller outside diameter at 95 in the middle, and rests in four freely running wheels 96 two at each side. These smaller wheels 96 have rubber tyres 97 which run in two V's 98 cut in the tube. The dimensions of the various driving and driven surfaces are chosen so that these small wheels 96 operate it at the same speed as the motor, as they run on gyroscopic bearings of the same design. The motor is mounted on two helical springs 101 central to the system, and by increasing the thrust on these in the downward direction by means of two screws 102 the pressure on the tube may be varied upwards from zero. It has been found that a very small pressure on the tube produces the smoothest running condition.

Figure 7 shows an arrangement whereby the apparatus may be modified for use with lenses of large aperture. In that modification a parallel light beam 103 is focussed by the lens 104 under test and falls on a concave mirror 105 which renders it parallel again but of much smaller diameter. It is then reflected by a plane reflector 106 which has a small hole or slit 107 in it. That hole or slit 107 is shaped to permit the beam from the lens just to pass through it near to the focus of the beam. The narrow parallel beam is employed in place of the test beam 36 in this modification. This arrangement permits the use of interferometer parts of practically small size, even when testing large lenses.

The parts of the apparatus which lie within the dotted rectangle 108 are mounted on a bed in the form of a fine-grained Mechanite casting which rests on, and interengages with, a large cushion of latex foam rubber material which has a large area of contact with the casting and with a large slab of marble on which the cushion rests. The marble slab is supported on four helical springs in compression. This arrangement effectively damps out all except very slow vibrations and prevents them from affecting the operation of the apparatus.

The invention is not restricted to the details of the apparatus and method described in the foregoing example. For instance, the reflector units 43, 44 may, with advantage, each be constructed alternatively as three mutually perpendicular plane reflecting surfaces, providing a so-called "corner-cube" reflector, but these are more difficult to construct with the required degree of accuracy. The reflector units 43, 44 may be moved by means of magnetostriction of a nickel rod arranged in a solenoid, instead of by the screw arrangement herein described, which alternative means may be used in conjunction with an alternating current to provide a means of continuously and cyclically varying the optical path length difference. In this way the output of the photo-multiplier device or other light detector employed also varies continuously and cyclically. It may be shown that the amplitude of this varying output measures the modulus of the frequency-transmission factor, which gives the contrast of a given spacial frequency component as it appears in the image. If, at the same time the mean path difference is adjusted, it is possible to determine the argument of the frequency transmission factor, which in turn measures the lateral shift of that spacial frequency component in the image relative to its ideal position. A thallium vapour lamp may be employed instead of a sodium vapour lamp.

The beam splitter 38 and the reflector units 43, 44 may alternatively be constructed as an integral unit providing a fixed amount of shear between the interfering wavefronts. The optical path length difference between the interfering beams may be varied by moving the slit 28, or equivalent effective source, slightly off the optical axis of the system. Two or more of such integral units may be provided, being interchangeable to vary the amount of shear.

The apparatus of the foregoing example may be modified so that the light source is not necessarily monochromatic. For instance, means may be provided for changing the optical path lengths by different amounts for various spectral wavelengths so that the change is proportional to the wavelength. The apparatus is then effectively achromatic and may then be used with light of any convenient spectral composition. In particular a "weighted" frequency transmission factor or characteristic may be measured directly by using a source having the average spectral composition of the objects with which the lens under test is intended to be used and a photo-multiplier or other detector device having a spectral response curve similar to that of the detector (e.g., the eye or a photographic film) with which the lens is intended to be used.

The aperture of the lens under test is not necessarily circular, as in the foregoing example, but may be of any other convenient shape. The overlapping images in the plane of the mask 54 will be of corresponding shape.

We claim:

1. Apparatus for testing optical means, which apparatus comprises a source of light, means for directing the light on to the said optical means, means for dividing the amplitude of the wavefront of the beam emergent from the said optical means to form two component beams having respectively two mutually similar coherent wavefronts, means for directing the component beams to overlap with their wavefronts parallel to one another but in sheared relationship, whereby the two coherent wavefronts mutually interfere, means for varying the amount of shear between the two wavefronts, and means for measuring the consequent change in the total light flux in at least a selected part of the interferogram produced by the interfering beams.

2. Apparatus for testing optical means, which apparatus comprises a straight line monochromatic source of light, means for directing the light on to the said optical means, means for dividing the amplitude of the wavefront of the beam emergent from the said optical means to form two component beams having respectively two mutually similar coherent wavefronts, means for directing the component beams to overlap with their wavefronts parallel to one another but in sheared relationship, so that the two coherent wavefronts mutually interfere, the direction of shear being effectively perpendicular to the length of the line source, means for varying the amount of shear between the two wavefronts, and means for measuring quantitatively the consequent change in the total light flux in at least a selected part of the interferogram produced by the interfering beams.

3. Apparatus as claimed in claim 2, in which the said means for dividing the wavefront comprise a partially reflecting partially transparent surface or layer.

4. Apparatus as claimed in claim 2, in which the said means for directing the component beams to overlap comprise, for each component beam, a reflecting unit comprising at least two mutually perpendicular plane reflecting surfaces arranged to reflect the component beam with which it is associated so that after reflection that beam travels parallel to its direction of incidence on the reflecting unit.

5. Apparatus as claimed in claim 4, in which at least one of said reflecting units is movable in a direction such as to vary the amount of the aforesaid shear between the two wavefronts.

6. Apparatus as claimed in claim 5, in which at least one of the said reflecting units is movable in a direction such as to vary the relative optical path lengths travelled by the two component beams before they overlap as aforesaid.

7. Apparatus as claimed in claim 2, including a second straight line source, similar to the first mentioned source and of the same color, means for directing light from said second source on to reference optical means similar to the optical means under test, means for repeatedly substituting the reference beam emerging from the reference optical means in place of the test beam emerging from the optical means under test, means for comparing the total light flux in at least a selected part of the said interferogram with the total flux in at least a similarly selected part of the corresponding interferogram, produced when the said reference beam is substituted for the said test beam, means for varying the relative total light fluxes in the reference beam and the test beam to make the total light fluxes in the selected part of the first mentioned interferogram and the selected part of the said corresponding interferogram equal before and after a change, as aforesaid, in the amount of shear, and means for indicating the amount of such variation and thereby indicating the said consequent change in the total light flux in the selected part of the first-mentioned interferogram.

8. A method of testing optical means, comprising directing light on to the said optical means, dividing the amplitude of the wavefront of the beam emergent from the optical means to form two component beams having respectively two coherent wavefronts, directing the component beams to overlap with their wavefronts parallel to one another but in sheared relationship, whereby the two coherent wavefronts mutually interfere to produce an interferogram, varying the amount of shear between the two wavefronts, and measuring the consequent change in the total light flux, for light of at least one color, in at least a selected part of the said interferogram.

9. A method of testing optical means, comprising directing light, derived from a straight line source, on to the said optical means, dividing the amplitude of the wavefront of the beam emergent from the said optical means to form two component beams having respectively two coherent wavefronts, directing the component beams to overlap with their wavefronts parallel to one another but in sheared relationship, so that the two coherent wavefronts mutually interfere, varying the amount of shear between the two wavefronts, and measuring quantitatively the consequent change in the total light flux, for light of at least one color, in at least a selected part of the interferogram produced by the interfering beams.

10. A method as claimed in claim 9, including repeatedly substituting a reference beam for the said emergent beam, and changing the relative total light fluxes in the reference beam and the emergent beam to compensate for the said change in the total light flux in the selected part of the interferogram, the required change in the said relative total light fluxes to produce such compensation providing a quantitative measure of the said change in the total light flux in the selected part of the interferogram.

11. Apparatus for testing optical means, which apparatus comprises a straight line monochromatic source of light, means for directing the light on to the said optical means, means for dividing the amplitude of the wavefront of the beam emergent from the said optical means to form two component beams having respectively two mutually similar coherent wavefronts, means for directing the component beams to overlap with their wavefronts parallel to one another but in sheared relationship, so that the two coherent wavefronts mutually interefere, the direction of shear being effectively perpendicular to the length of the line source; means for varying the relative optical path length travelled by the two component beams before they overlap as aforesaid, and means for measuring the consequent change in the total light flux in at least a selected part of the interferogram produced by the interfering beams.

12. Apparatus as claimed in claim 11, in which the said means for dividing the wavefront comprise a partially reflecting partially transparent surface or layer.

13. Apparatus as claimed in claim 11, in which the said means for directing the component beams to overlap comprise, for each component beam, a reflecting unit comprising at least two mutually perpendicular plane reflecting surfaces arranged to reflect the component beam with which it is associated so that after reflection that beam travels parallel to its direction of incidence on the reflecting unit.

14. Apparatus as claimed in claim 13, in which at least one of the said reflecting units is movable in a direction such as to vary the amount of the aforesaid shear between the two wavefronts.

15. Apparatus as claimed in claim 14, in which at least one of the said reflecting units is movable in a direction such as to vary the relative optical path lengths travelled by the two component beams before they overlap as aforesaid.

16. Apparatus as claimed in claim 11, including a second straight line source, similar to the first mentioned source and of the same color, means for directing light from said second source on to reference optical means similar to the optical means under test, means for repeatedly substituting the reference beam emerging from the reference optical means in place of the test beam emerging from the optical means under test, means for comparing the total light flux in at least a selected part of the said interferogram, with the total flux in at least a similarly selected part of the coresponding interferogram, produced when the said reference beam is substituted for the said test beam, means for varying the relative total light fluxes in the reference beam and the test beam to make the total light fluxes in the selected part of the first mentioned interferogram and the selected part of the said coresponding interferogram equal before and after a change, as aforesaid, in the amount of relative optical path lengths, and means for indicating the amount of such variation and thereby indicating the said consequent change in the total light flux in the selected part of the first-mentioned interferogram.

17. Apparatus as claimed in claim 16, in which the said means for repeatedly substituting the reference beam in place of the test beam comprise means for repeatedly rendering the sources alternately inoperative.

18. A method of testing optical means, comprising directing light, derived from a straight line source, on to the said optical means, dividing the amplitude of the wavefront of the beam emergent from the said optical means to form two component beams having respectively two coherent wavefronts, directing the component beams to overlap with their wavefronts parallel to one another but in sheared relationship, so that the two coherent wavefronts mutually interfere, varying the relative optical path lengths travelled by the two component beams before they overlap as aforesaid, and measuring quantitatively the consequent change in the total light flux, for light of at least one color, in at least a selected part of the interferogram produced by the interfering beams.

19. A method as claimed in claim 18, including repeatedly substituting a reference beam for the said emergent beam and changing the relative total light fluxes in the reference beam and the emergent beam to compensate for the said change in the total light flux in the selected part of the interferogram, the required change in the said relative total light fluxes to produce such compensation providing a quantitative measure of the said change in the total light flux in the selected part of the interferogram.

References Cited in the file of this patent

UNITED STATES PATENTS

| | | |
|---|---|---|
| 1,565,533 | Twyman et al. | Dec. 15, 1925 |
| 2,471,249 | Stearns et al. | May 24, 1949 |
| 2,583,596 | Root | Jan. 29, 1952 |
| 2,601,182 | Tyler | June 17, 1952 |

FOREIGN PATENTS

| | | |
|---|---|---|
| 717,233 | Great Britain | Oct. 27, 1954 |

OTHER REFERENCES

Proceedings of the Physical Society of London, vol. 59, pages 940–950, Bates article.

Optik, vol. 8, Number 12, 1951, pages 561–569, Rienitz article. Pages 562 and 564 solely relied on.